Sept. 22, 1970     H. L. PENBERTHY     3,530,221
AC/DC ELECTRODE AND POWER SUPPLY SYSTEM FOR A GLASS FURNACE
Filed May 1, 1968     2 Sheets-Sheet 1

INVENTOR
H. LARRY PENBERTHY

ATTORNEY

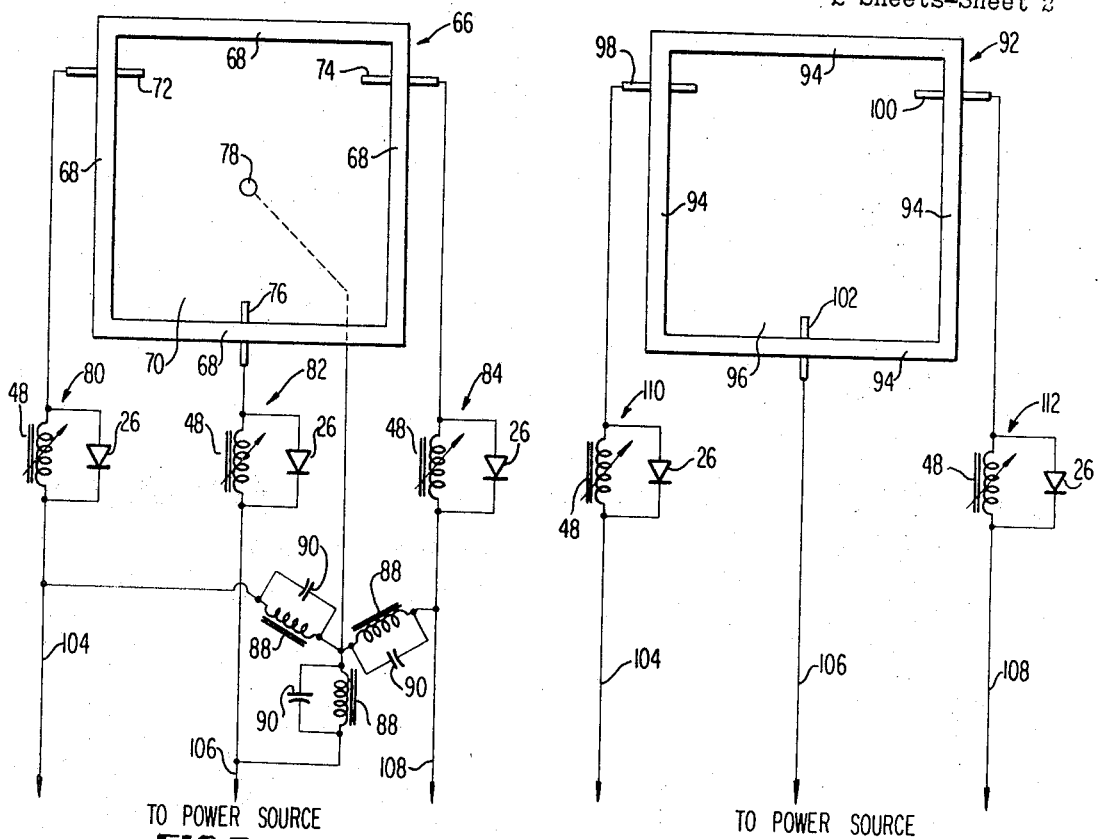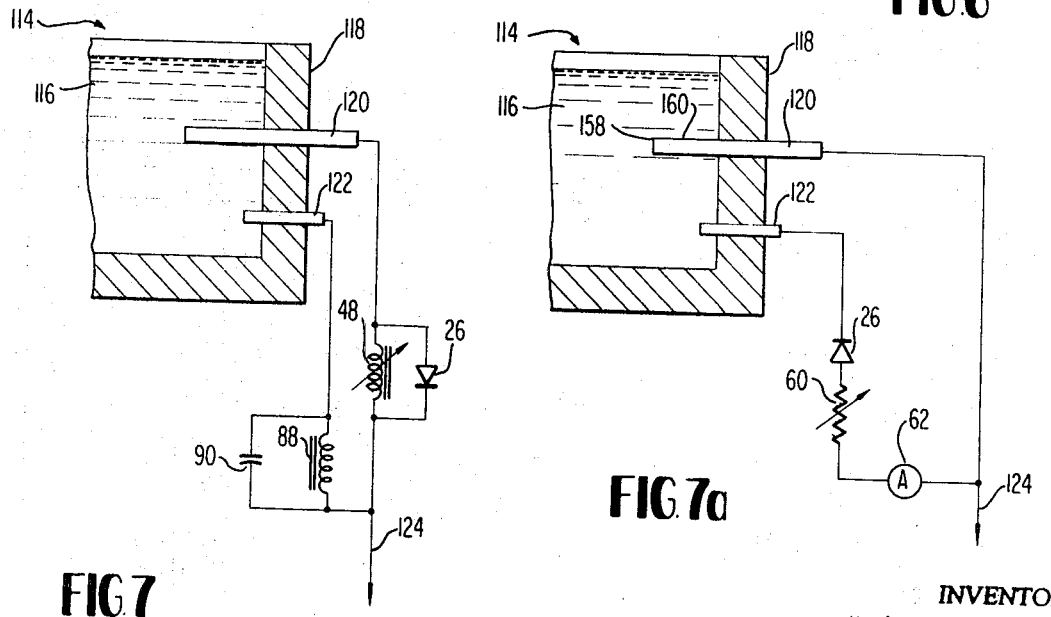

United States Patent Office 3,530,221
Patented Sept. 22, 1970

3,530,221
AC/DC ELECTRODE AND POWER SUPPLY SYSTEM FOR A GLASS FURNACE
H. Larry Penberthy, 5624 SW. Admiral Way, Seattle, Wash. 98116
Filed May 1, 1968, Ser. No. 725,886
Int. Cl. C03b 5/02
U.S. Cl. 13—6      11 Claims

ABSTRACT OF THE DISCLOSURE

Disclosed is an electrode and power supply assembly for protecting electrodes in electrically heated glass furnaces. An alternating current having a DC component is passed through one or more of the heating electrodes in the furnace. The electrode is formed of a material resistant to ions having one type of electrical charge and is polarized by the DC component such that ions of opposite charge are repelled by the electrode. The result is greater current carrying capacity and longer life for the electrode or electrodes so protected.

---

This invention relates to an arrangement for supplying heating current to glass furnaces and more particularly to a novel heating electrode construction used in conjunction with a combination AC/DC supply circuit.

In the past, it has been common to use molybdenum electrodes for both the positive and negative heating electrodes of the furnace. Other electrode materials, such as platinum, tin oxide and graphite, are also used. To avoid polarization of the electrodes, alternating current is generally used, even to the extent of high frequency. However, even with alternating current, when there is a high current density (amperes per square inch electrode surface) applied to the electrodes, it has been found that too much sulphate is brought adjacent some of the electrodes, causing extra wear of the electrodes, especially when made of molybdenum. A common limitation in a furnace using an AC supply and all molybdenum electrodes has been something in the neighborhood of 12 amperes per square inch.

In use, molybdenum electrodes are attacked in glasses having sodium sulphate by the thermal diffusion and electrical transfer of $SO_4^{-2}$ ions to the surface of the molybdenum. The wear takes place by a breakdown of the $SO_4^{-2}$ ion to $SO_2$ and oxygen, whereby the oxygen combines with the molybdenum to make molybdenum oxide which is soluble in glass. By contrast, the sodium ions which also appear in the glass are of a like nature to molybdenum and there is no interaction with the molybdenum electrodes.

Tin oxide electrodes in normal use are attacked by the sodium ions which can take oxygen away from the tin oxide and allow tin metal to fall to the floor of the furnace. The sulphate ions are of like nature to the tin oxide and there is no harmful effect when the $SO_4^{-2}$ decomposes near these electrodes. It has been found that when tin oxide is the material of both electrodes, the sodium ion attacks the tin oxide above current densities of about 5 amperes.

Attempts have been made in the past to overcome the effects of cations and/or anions on the heating electrodes of a glass furnace by supplying a separate DC electrolyzing current to one or more of the heating electrodes. However, insofar as applicant is aware, these arrangements have involved the provision of a separate DC source and at least one separate DC electrode, of necessity resulting in a different geometry for the DC current path as opposed to the AC current path through the furnace. Because of the difference in geometry, it is very difficult to balance the AC versus the DC currents and as a result, adequate protection of the electrodes is not obtained. That is, because of differences in geometry, certain areas of the electrodes may be underprotected by the DC whereas other areas may be overprotected.

The present invention avoids the above-mentioned and other difficulties by providing two sets of one or more electrodes each, wherein each set is formed of a different material resistant respectively to anion or cation attack, while at the same time passing through the electrodes in the proper direction, an AC current having superimposed thereon a relatively small DC component. Since the DC component is superimposed on the AC and applied between the same heating electrodes, it encounters the same geometry in the furnace and when properly adjusted, automatically provides the right amount of electrolytic protection for both sets of electrodes.

Specifically, the present invention provides an electrical furnace wherein electrical heating is supplied wholly or partially by Joule effect heating electrodes wherein one set of electrodes is formed from a cation resistant material and the electrodes of the other set are formed from an anion resistant material. At the same time, superimposed on the AC heating current is a DC component of such polarity as to drawn anions to the anion resistant set of electrodes and to at the same time, direct the cations to the cation resistant electrodes. In glasses containing sodium sulphate, the positive electrode for the DC component is preferably formed of tin oxide whereas the negative electrode for the DC component is formed of molybdenum. By means of this arrangement, the sulphate ions can be depleted from the vicinity of the molybdenum and the allowable current density rises to double the previous known values with a corresponding reduction in the capital investment for a given furnace. Another advantage offered by the present invention is that the operating cost is reduced because the life of especially the molybdenum electrode or electrodes is greatly extended. For example, an electrode of molybdenum which is used in a normal colorless soda lime glass would have a life of four months. By utilizing the system of the present invention, electrode wear is practically negligible and the life of the electrode becomes virtually unlimited.

The same considerations apply to the tin oxide electrode or electrodes. When tin oxide is the material of both electrodes, the sodium ion attacks the tin oxide above current densities of about 5 amperes. With the system of the present invention, it has been found possible to operate tin oxide electrodes at current densities as high as 40 amperes.

It is therefore one object of the present invention to provide an improved electrode assembly and power supply circuit for electrically heated glass furnaces.

Another object of the present invention is to provide an electrically heated glass furnace with two sets of one or more heating electrodes each wherein the electrodes of the respective sets are formed from different material.

Another object of the present invention is to provide an electrode assembly for supplying heat to glass furnaces having two sets of electrodes with one set formed of a cation resistant material and the second set formed of an anion resistant material and including in the heating current a DC component for drawing the anions from the glass to the anion resistant electrodes and the cations in the glass to the cation resistant electrodes.

Another object of the present invention is to provide an electrically heated furnace with an electrolytic electrode protection current in the form of a DC component directly superimposed on the AC energy passing between the heating electrodes.

Another object of the present invention is to provide an electrically heated glass furnace with a first set of one or more heating electrodes formed of tin oxide and a second set of one or more heating electrodes formed of molybdenum and supplying electrical energy to the electrodes in the form of AC with a relatively small DC component superimposed thereon such that the tin oxide electrodes act as an anode and the molybdenum electrodes act as a cathode for the DC component. This makes it possible to significantly increase the current density of the heating current supplied to the furnace through the electrodes and at the same time greatly increases electrode life.

These and further objects and advantages of the invention will be more apparent upon reference to the following specification, claims and appended drawings wherein:

FIG. 2 shows the wave form for the current passing through the two sets of electrodes of the furnace of FIG. 1;

FIG. 4 shows a typical current wave form obtainable with the modified circuit arrangements of FIGS. 3 and 3a.

FIG. 5 shows a modified embodiment illustrating a three electrode assembly constructed in accordance with the present invention and energized from a three phase power supply;

FIG. 6 shows a further modification incorporating a three electrode assembly in a glass furnace energizable from a single phase power source;

FIG. 7 is a partial sectional view through a still further modified embodiment usable with either a single phase or three phase power supply;

FIG. 7a is a view similar to FIG. 7 incorporating a modified DC component producing circuit.

In the past, attempts have been made to protect the heating electrodes of glass furnaces by applying a DC electrolytic potential to various electrodes of the furnace.

One arrangement for doing this is disclosed in Eden Pat. 2,855,450. For example, in FIGS. 1 and 2 of that patent, a DC electrode is located outwardly from the main firing path of the melting current. This has the disadvantage that it causes the cations to be plated on the side of the electrode which is away from the other melting electrode, where they are not effective. The alternating current concentration firing between the heating electrodes is able to overcome the protective effect of the DC current. If the DC current is increased in magnitude to reach the other side of the melting electrode undesirable effects follow whereby sodium metal is deposited on the outward side of the power electrodes and the resulting sodium metal discolors the glass.

Figure 3:
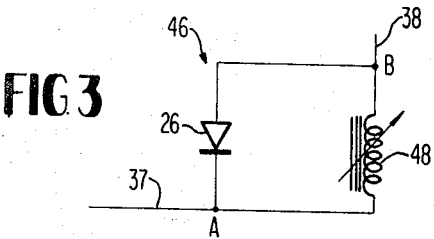
FIG. 3 shows a modified electrical circuit usable with the furnace of FIG. 1.

In FIG. 3 of U.S. Pat. 2,855,450 is shown an arrangement which attempts to overcome this difficulty by having the DC electrode located between the two AC electrodes. This relationship partly meets the problem of applying the protective cations to the proper sides of the power electrodes, but unfortunately the DC electrode is in the main firing path of the alternating current and is subject to damage thereby as if it were itself a power electrode. Furthermore, the alternating current impinging on the DC electrode is not the same magnitude as the alternating current on the AC power electrodes because of the different geometry, and therefore it is impossible to select a value for the DC which is correct for both the DC electrode and the AC electrodes.

In the present invention, the problem is overcome since the current passing through the molybdenum electrode is the same as the current passing through the tin oxide electrode so that problems due to unbalance or different geometry are avoided.

One arrangement described below for superimposing DC current on AC is to use a silicon controlled rectifier hereafter referred to as an SCR in the AC power line. The SCR is provided with a firing circuit which makes one side higher with a phase angle slightly less than the firing phase angle of the other side. Thus, there is a small DC component superimposed on the main AC melting current. This DC melting component is arranged with a polarity such that the molybdenum electrode is the cathode to attract the sodium ions (cations) and repel the sulphate ions (anions), and the tin oxide electrode is made the anode to attract the sulphate ions and repel the sodium ions.

Thus, in the present invention the DC component of current is distributed precisely in the right places on the respective electrodes according to the concentration of alternating current at each point on the electrode. This is so because the DC component is a part of the actual alternating current used for melting. It is virtually impossible for prior arrangements to accomplish this since they employ a third electrode which necessarily must be a different geometry from the power electrodes. Accordingly, the DC current distribution in prior constructions on the power electrodes is different from the AC current distribution. Thus, some areas of the power electrodes are underprotected at some points or are overprotected at other points or a combination of both. Underprotection as used herein means that the electrode will be consumed, and overprotection means that sodium metal will be plated out causing discoloration.

Figure 1:
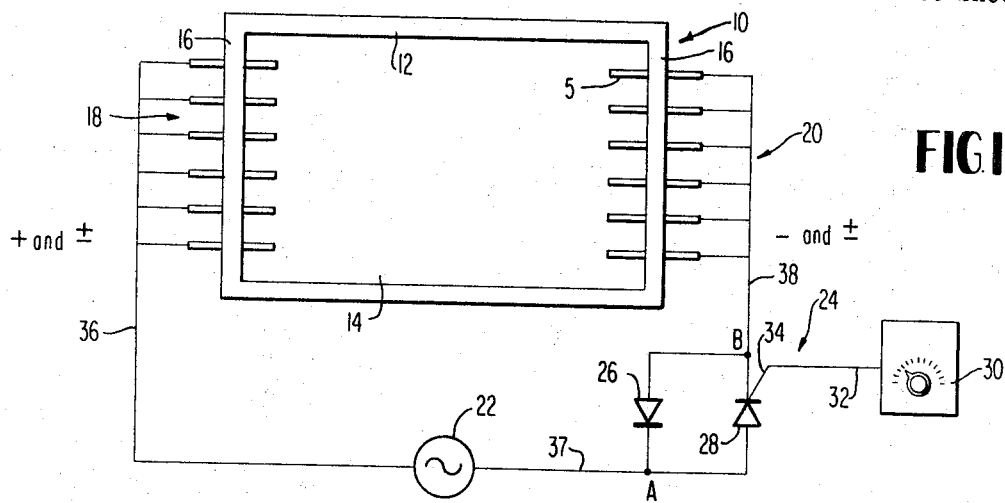
FIG. 1 is a plan view of a glass furnace constructed and operated in accordance with the present invention.

Referring to the drawings, FIG. 1 is a plan view of a furnace generally indicated at 10 having sidewalls 12 and containing glass 14. The end walls 16 of the furnace hold two sets of electrodes 18 and 20. Each set is illustrated as comprised of six electrodes, but it is understood that any number of electrodes may form each set in accordance with the particular heating desired. These electrodes pass a heating current through the glass 14 due to the well known Joule effect and the electrodes may constitute the sole means for heating the glass or may be used in conjunction with fuel firing. Thus, for the purposes of this disclosure, the plurality of small electrodes forming the sets 18 and 20 are equivalent to a single large electrode. In FIG. 1, electrodes 18 are of the refractory ceramic oxide type such as tin oxide, which are resistant to oxygen. Alternatively, they could be formed of platinum, which is also resistant to oxygen. Electrodes 20 are electrodes not resistant to oxygen preferably molybdenum, but they can also be made of graphite.

A source of alternating current 22 is connected to the respective electrodes through a DC component device generally indicated at 24. This device can be any circuit which permits more electrons to flow in one direction in the cables than in the other. In FIG. 1, electrons can flow freely from the point in the circuit indicated at A to a point in the circuit indicated at B through a rectifier diode 26. However, the flow of electrons from B to A on the reverse half of the alternating current cycle is under the control of an SCR 28 connected in parallel with rectifier diode 26. An adjustable trigger circuit 30 is connected by lead 32 to the gate electrode 34 of the SCR. Trigger circuit 30 is adjustable and can fire the SCR to permit conduction through the entire reverse cycle or a delay can be introduced so that the reverse flow of alternating current is incomplete. The current passes from the source through the circuit 24 to the two sets of electrodes 18 and 20 by way of leads 36, 37, and 38.

Figures 2, 4:
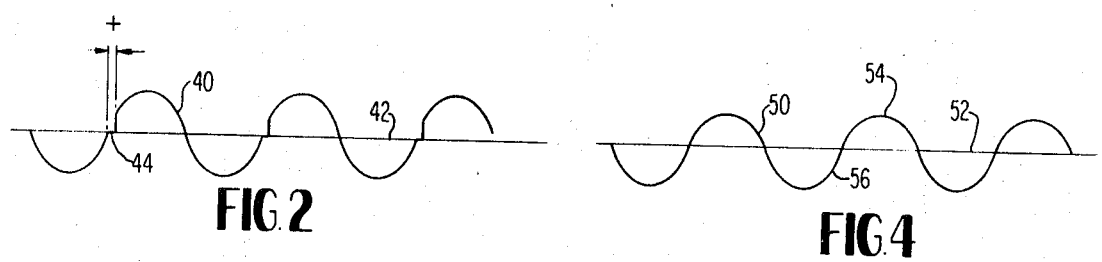

FIG. 2 shows a current wave form 40 alternating above and below a reference or zero value indicated by the line 42. In this wave form, the conduction of the SCR is delayed in the upper half cycle, where the current passes through zero line 42 for a period of time T. During this time, the current to the electrodes is zero as indicated by the coincidence of the wave form with the zero line at 44. Since the area between the curve and the base line 42 indicates the quantity of electrons flowing, it can be seen that a lesser quantity of electrons is flowing in the upper half of the current wave than in the lower half.

An alternative circuit 46 for creating a differential flow of electrons in the two halves of the alternating current cycle is shown in FIG. 3. Circuit 46 may be used to replace the circuit 24 of FIG. 1. In this circuit, rectifier diode 26 is connected in parallel with a variable choke 48 between circuit points A and B. Diode 26 again allows free flow of electrons from A to B in that portion of the cycle whereas the variable choke 48 impedes the flow of electrons from B to A in the second half of the cycle. The alternating current wave form for the circuit of FIG. 3 is illustrated at 50 in FIG. 4 as alternating about the reference or zero line 52. As can be seen, the amplitude of each upper half cycle 54 is less than the amplitude of each lower half cycle 56. Again the area between the curves and zero line 52 indicates that the quantity of electrons in the upper half of the cycle is diminished with respect to the quantity of electrons passed in the half cycle below the line. This differential is adjustable by varying the value of the choke coil 48 in FIG. 3. Other variations for accomplishing differential flow of electrons are possible and for example diode 26 may itself be an SCR, under control of a firing circuit which permits a differential firing between it and SCR 28 in FIG. 1.

Figure 3A:
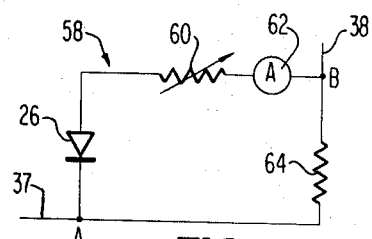
FIG. 3a shows a further modified circuit arrangement for obtaining an AC wave form having a DC component.

FIG. 3a shows a still further modified circuit 58 for inserting the DC component into the furnace of FIG. 1. In this arrangement, rectifier diode 26 is connected in series with a variable resistor 60 and a DC ammeter 62. These elements are all connected in parallel between the points A and B with a small resistor 64 which may in practice be the inherent resistance of the electrode supply leads or cable as it goes from the power supply to one set of electrodes. In this arrangement the electrons traveling from A to B have an easier pathway because the current carrying capacity of the cable, as represented by resistor 64, is parallel with the conductive path through diode 26 and variable resistor 60. However, for electron flow in the reverse direction from B to A, electron flow through this parallel path is completely blocked by rectifier 26. Thus, there is more current flowing when the electrons are traveling in the direction AB than when they are traveling in the direction BA. Ammeter 62 is used for determining the proper setting for variable resistor or potentiometer 60. Good results have been found when the DC ammeter 62 has a reading showing a current of about $\frac{1}{10}$ of 1% of the main alternating current. The direct current thus measured is not smooth direct current but instead is a series of pulses, one each cycle.

The furnace illustrated in FIG. 1 is single phase. When it is desired to take power from a three phase line, three single-phase circuits can be set up connected to three pairs of electrodes in the bath. Each pair with its single phase circuit can be caused to function according to the arrangement shown in FIG. 1.

It is also possible to use a three phase supply whereby one of the directional choke assemblies such as is illustrated in FIG. 3 for single phase is used on each of the electrodes, with the unbalanced current returning by way of a fourth electrode. This arrangement has the same advantages as that previously described in that the current which is applied as DC is actually a part of the main melting power current and hence is precisely located with respect to current density on the electrode itself. In other words, if there is a high current density at the tip of the electrode, the DC component is also high there. If the current density is low near the base of the electrode, the DC component is low there also.

FIG. 5 shows such an arrangement comprising a furnace generally indicated at 66 having walls 68 and containing glass at 70. Passing through the furnace with their ends immersed in the glass 70 are three power electrodes 72, 74, and 76. Also immersed in the glass and extending upwardly through the bottom of the furnace is a DC component return electrode 78. Connected to each of the power electrodes 72, 74 and 76 is a DC insertion circuit 80, 82 and 84 in all respects identical to the circuit illustrated in FIG. 3 and each comprising a rectifier diode 26 in parallel with a variable choke 48. These circuits are connected by leads 104, 106, and 108 to a suitable three phase power supply. Again the variable choke 48 in each electrode lead passes current in both directions but with an adjustable impedance whereas diode 26 passes current freely in one direction only. The polarity of each diode 26 in FIG. 5 is chosen according to the nature of the material of the power electrodes 72, 74 or 76. When the power electrodes are made of molybdenum or other materials subject to oxidation, the diodes 26 are arranged to provide an electron surplus at the power electrodes 72, 74 and 76 in order to attract the cations. When the power electrodes are made of a material resistant to oxygen, the polarity of the diodes 26 is reversed to attract anions to the power electrodes. In the arrangement of FIG. 5, all three power electrodes may be made of the same material since they electrolytically cooperate with separate electrode 78.

In the embodiment illustrated in FIG. 5, the power electrodes 72, 74 and 76 are all preferably made of the same material. Thus, there is a net current flow of electrons from them into or out of the bath. This net current flows through the bath to electrode 78, which is made of a material opposite to that of the power electrodes. That is, if the power electrodes are made of molybdenum, electrode 78 is made of tin oxide or vice versa. Electrode 78 returns this net current to the power source by connection to the start-up point 86 of a direct-current pass filter having three sections, each comprising a choke coil 88 and a parallel capacitor 90. Each fixed choke coil 88 has a high impedance both to the regular alternating current used for melting power and also for the pulsating DC component introduced by each of the variable chokes 48 and diodes 26. However, the DC component builds up in voltage across each of the capacitors 90 and then leaks away through its respective fixed choke 88 which can pass on continuous direct current.

FIG. 6 shows another embodiment of the present invention comprising a furnace generally indicated at 92 having walls 94 and containing glass 96 within it in which are submerged the inner ends of the power electrodes 98, 100 and 102. Again, the embodiment illustrated in FIG. 6 is arranged for connection to a three phase power supply by way of leads 104, 106 and 108. Connected in the supply line to electrodes 98 and 100 are DC insertion circuits 110 and 112 again comprising parallel rectifier diodes 26 and variable chokes 48. No DC component producing circuit is provided in the third phase lead 106 of the supply line feeding power electrode 102.

In the embodiment of FIG. 6, electrodes 98 and 100 are made of the same kind of electrode material, for example, oxidizable, but electrode 102 is made of another kind of material, i.e., nonoxidizable. The direct current component devices 110 and 112 consisting of the parallel variable chokes and diodes are in the lines to electrodes 98 and 100 but none is needed in the supply line to electrode 102. The direct current from both electrodes 98 and 100 is returned to the power source through electrode 102. This does no harm in the embodiment of FIG. 6 since it results only in an increase in sulphur dioxide-plus-oxygen bubbling at electrode 102. Usually there is a surplus of sulphate in the glass, and thus the extra consumption does no harm.

It is to be noted that in the arrangement of FIG. 5 the direct current density on electrodes 72, 74 and 76 coincides exactly with the alternating current density in phase as well as location. This is not quite true in the embodiment of FIG. 6 where the alternating current density of one of the electrodes 98 and 100 with respect to electrode 102 is provided with a direct current component which corresponds in location and phase, but the current which passes between electrodes 98 and 100 does not have this DC component relationship. Accordingly, the DC component between electrodes 98 or 100 and electrode 102 is increased above the normal in order to provide a surplus of protection against the current which flows from electrode 98 to 100 and which does not have the direct current component protection.

FIG. 7 shows a further modification suitable for either single phase or three phase operation. In that figure, a portion of a furnace generally indicated at 114 is illustrated having glass 116 retained within side walls 118. Projecting through the wall is a power electrode 120 and an auxiliary electrode 122, the inner ends of both electrodes being submerged in the glass 116. While only a single power electrode 120 is illustrated, it is understood that this electrode cooperates with one or more additional power electrodes of similar construction projecting into the glass 116 at other suitable locations in the furnace. Auxiliary electrode 122 is illustrated as being located near power electrode 120 but its location in the furnace is not critical. A lead or bus bar 124 connects either to a single phase supply or to one phase of a three-phase supply and supplies heating energy to the power electrode 120 through a DC component circuit, again comprising a parallel arrangement of rectifier diode 26 and variable choke 48. Connected across these latter two elements from bus bar 124 to auxiliary electrode 122 is a filter in the form of a fixed choke 88 and capacitor 90, which parallel elements act as a filter in the same manner as in the previously described embodiment of FIG. 5. In FIG. 7, the main alternating current passes through the bus bar 124 through the direct current component device consisting of variable choke coil 48 and rectifier diode 26 to the electrode 120 and thence through the bath back to the other power electrode or electrodes (not shown) in furnace 114. The DC component flows into the bath from electrode 120 and flows back to the source through auxiliary electrode 122 and the direct current pass filter consisting of choke coil 88 and capacitor 90. The arrangement of FIG. 7 works whether the electrode is connected single phase, three phase or with any multiphase arrangement of electrodes in the furnace.

FIG. 7a shows a modified embodiment of the arrangement of FIG. 7 with like parts bearing like reference numerals. In this embodiment, power electrode 120 is connected directly to the bus bar 124 in turn coupled to the power supply. However, auxiliary electrode 122 is connected to the bus bar by way of rectifier diode 26, variable resistor 60 and DC ammeter 62, much in the manner illustrated in FIG. 3a. In FIG. 7a, when electrons are moving from the power line into the bath, power electrode 120 can carry them but auxiliary electrode 122 cannot because they are blocked by rectifier diode 26. When electrons are moving from the bath into the electrodes and onto the source of power, they can enter the circuit through both electrodes 120 and 122. This makes the effective resistance of the bath circuit somewhat lower and more electrons will flow than went in the other direction. The important point here is that electrode 122 takes electrons away from electrode 120. Since these electrons are carried by anions such as sulphate, there is an increased concentration of anions around electrode 122. When electrode 122 is made of non-oxidizable material, no harm is done to the electrode.

The skin of glass immediately surrounding power electrode 120 is enriched with electrons, since they flow outwardly but do not flow back into electrode 120 in the same quantity. Accordingly, sodium ions are attracted to electrode 120 where they do no harm as previously explained.

Figure 8:
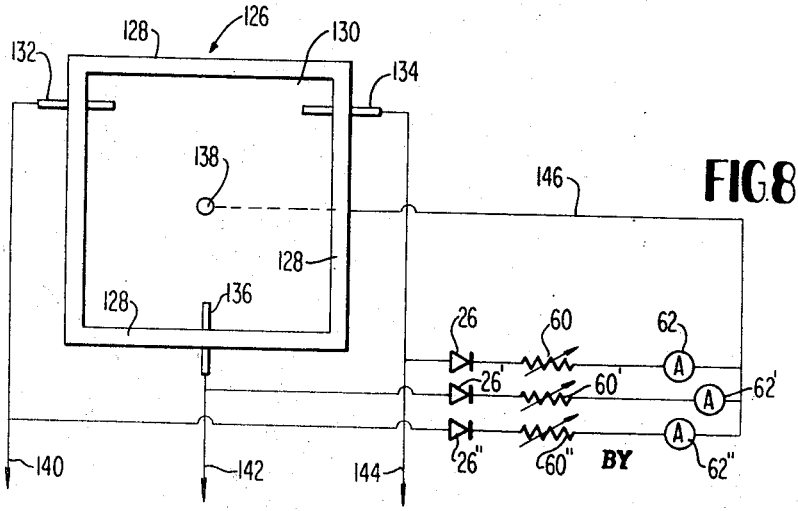
FIG. 8 shows a further modified embodiment for either single or three phase operation.

The arrangement of FIG. 7a can be used in a way similar to the arrangement of FIG. 5 where one non-oxidizable electrode can serve a plurality of oxidizable electrodes. This arrangement is shown in FIG. 8, where a furnace generally indicated at 126 is provided with walls 128 surrounding glass at 130 in which is submerged the inner ends of power electrodes 132, 134 and 136. Projecting into the glass from the bottom of the furnace is an auxiliary electrode 138. Leads 140, 142 and 144 connect the power electrodes to the respective phases of a three-phase power supply. Electrode 138 is connected to the power supply by lead 146 and specifically to each of the phases by way of a separate series combination of rectifier diode 26, variable resistor 60 and DC ammeter 62. The corresponding components for the second and third phases are primed in the drawings to show full correspondence.

In the arrangement of FIG. 8, the surplus electrons can leave the bath and go into electrode 138 and return to the power line, thus leaving a scarcity of electrons in the vicinity of electrode 138. This attracts the sulphate ions as previously discussed. Conversely, a surplus of electrons builds up around the power electrodes 132, 134 and 136, thus attracting the cations such as sodium. When the power electrodes are made of nonoxidizable material and electrode 138 is made of oxidizable material, then the polarity of diodes 26, 26' and 26" are reversed.

It is apparent from the above that the present invention provides an improved electrode assembly and power supply circuit for heating glass having increased efficiency of operation and longer life for the electrodes. An important feature of the invention includes the fact that in all instances, the DC component is a part of the AC wave itself, and hence the DC component is distributed proportionately wherever the AC component leaves or enters the electrodes. For example, in FIG. 7a, the end 158 of electrode 120 will normally have a higher current density per square inch than the shank portion 160. With the present invention, this non-uniform distribution of AC component is not important because the DC component is distributed in the same ratio. By contrast, prior constructions having separate DC circuits have provided a DC current that distributes itself independently of, rather than coincidentally with, the main AC current. Accordingly, in prior constructions, the end of the electrode is underprotected and the short shank portion is usually overprotected. Only a small band of the prior electrodes in the region intermediate the end of the shank generally has sufficient protection. Because of the differing geometry and balance difficulties in prior constructions, if the DC component is increased to provide adequate protection near the end of the electrode, then the DC component is so high at the shank that sodium is plated out adjacent the shank of the electrode and causes discoloration in situations where the glass is a normal soda lime container glass such as used for containers. Such a streak of colored glass is objectionable.

It has been discovered that a molybdenum electrode versus a tin oxide electrode forms a natural galvanic couple having a DC potential of about 2.3 volts in soda lime container glass at 2500° F. The molybdenum is consumed in the glass. This releases electrons at the molybdenum. If there is an external circuit, these electrodes are not stored in the molybdenum but instead flow away to the tin oxide electrodes where the electrons tend to attract positively charged cations such as sodium and molybdenum from the melt. When the positive charge of the cations is discharged by the electrons, the cations become the corresponding metals with a zero charge. They are then able to take oxygen from the tin oxide and reduce the tin oxide to tin, thus destroying the electrodes.

In the present invention, this natural flow of electrons is reversed and a surplus of electrons is forcibly maintained on molybdenum electrode. This electron charge attracts the positively ionized cations, sodium for example, which is compatible with molybdenum. Alloys can be formed if there is a surplus of the cationic metal at the molybdenum but there is no destruction by oxidation. Correspondingly, in practicing the invention, a scarcity of electrons is maintained on the tin oxide electrodes, thus attracting the negatively charged sulphate ions. These sulphate ions give up their extra electrons to produce sulphur trioxide which in turn breaks down to sulphur dioxide and oxygen. The tin oxide electrodes are inert to both of these gases and there is no deterioration of the tin oxide electrode.

It has been found that it is desirable to control the DC component to the right amount to prevent destruction of the electrodes but not to have an excessive DC component which would cause sodium metal to be plated on the molybdenum electrodes and sulphate to be decomposed on the tin oxide electrodes. The amount of the DC component is controlled by observing the glass bath immediately over the tin oxide electrodes for evidence of bubbling. If the bubbling is excessive, the DC component is reduced until the bubbling is nearly stopped. Similarly, it is desirable to occasionally examine one of the molybdenum electrodes by withdrawing it from the furnace. If the electrode shows evidence of wear, the DC component is not sufficient. If the surface of the molybdenum is plated with sodium or other metals from the melt, the DC component is excessive.

As a specific example, in one embodiment, the voltage between electrodes was 120 volts with a current of 220 amperes. These numbers were obtained with regular panel ammeters, of alternating current type. By means of a DC voltmeter protected by a choke coil, it was learned that in this example the DC component was about 6 volts. The electrode which was being protected showed practically no wear in the course of seven months in a glass which was medium in oxidation. Other electrodes in the same bath which were not protected showed a reduction in diameter to about 1¼ inches from the original 2 inch diameter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a furnace for melting glass containing ion producing materials, a heating electrode projecting into said furnace and formed of material subject to destructive attack by ions in said furnace, and means coupled to said electrode for passing through it alternating current, said coupling means including a rectifier for imparting a DC component to said current, said rectifier being poled so that the polarity of said electrode for said DC component is such that said ions are repelled by said electrode.

2. Apparatus according to claim 1 wherein said electrode is made of anion resistant material and is positive for said DC component.

3. Apparatus according to claim 1 wherein said electrode is made of cation resistant material and is negative for said DC component.

4. In a furnace for melting glass containing ion producing materials, first and second sets of electrodes projecting into said furnace, the electrodes of opposite sets being symmetrically arranged in pairs for the flow of heating current between the electrodes of a pair, the electrodes of said first set being made of anion resistant materials and the electrodes of said second set being made af cation resistant materials, and means coupled to each said pair for passing through them alternating current, said coupling means including a rectifier for imparting a DC component to said current, said rectifier being poled so that the polarity of said electrodes for said DC component is such that ions to which each electrode is resistant are attracted by said electrode.

5. Apparatus according to claim 4 wherein said coupling means comprises a diode rectifier and a silicon controlled rectifier connected in parallel.

6. Apparatus according to claim 4 wherein said coupling means comprises a diode rectifier and a variable choke coil connected in parallel.

7. Apparatus according to claim 4 wherein said coupling means comprises a diode rectifier and variable resistor connected in series, and a second resistor connected across said rectifier and variable resistor.

8. In a furnace for melting glass containing ion producing materials, a plurality of power electrodes projecting into said furnace, an auxiliary electrode projecting into said furnace, said power electrodes being resistant to ions of one polarity, said auxiliary electrode being resistant to ions of the opposite polarity, means for coupling said power electrodes to an AC power supply, and means coupling each of said power electrodes to said auxiliary electrode including a differential impedance having a greater impedance to current flow in one direction than to current flow in the other direction for imparting a DC component to the current through said power electrodes, said auxiliary eleutrode acting as a return for said DC component, said differential impedance being poled so that the polarity of said electrodes for said DC component is such that ions to which each electrode is resistant are attracted by said electrode.

9. Apparatus according to claim 8 in which said differential impedance is a rectifier.

10. Apparatus according to claim 9 including a separate power supply lead connected to each of said power electrodes for coupling said power electrodes to an AC power supply, said coupling means comprising a rectifier and a current controlling variable resistor connected between said auxiliary electrode and each of said power electrodes.

11. Apparatus according to claim 10 including at least three power electrodes, a power supply lead connected to each power electrode for coupling said power electrodes to the different phases of a multiphase power supply, and a separate rectifier and current controlling variable resistor connecting said auxiliary electrode to each of said power supply leads.

References Cited

UNITED STATES PATENTS

| | | | |
|---|---|---|---|
| 2,490,825 | 12/1949 | Mochel | 13—18 |
| 2,545,619 | 3/1951 | Lambert | 13—6 |
| 2,902,524 | 9/1959 | Paxton | 13—6 |
| 3,198,932 | 8/1965 | Weatherly | 13—18 |

BERNARD A. GILHEANY, Primary Examiner

R. N. ENVALL, Jr., Assistant Examiner

U.S. Cl. X.R.

13—18